(12) United States Patent  (10) Patent No.: US 8,180,144 B2
Whiting                    (45) Date of Patent: May 15, 2012

(54) HOLE PUNCH DIE IDENTIFICATION IN A DOCUMENT REPRODUCTION SYSTEM

(75) Inventor: J. Frederick Whiting, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 617 days.

(21) Appl. No.: 12/423,920

(22) Filed: Apr. 15, 2009

(65) Prior Publication Data

US 2010/0266197 A1    Oct. 21, 2010

(51) Int. Cl.
 *G06K 9/62*    (2006.01)
(52) U.S. Cl. ....................................................... 382/152
(58) Field of Classification Search .......................... None
See application file for complete search history.

(56) References Cited

U.S. PATENT DOCUMENTS

| | | | | |
|---|---|---|---|---|
| 5,150,422 A * | 9/1992 | Kitakado et al. | ............... | 382/148 |
| 5,606,411 A * | 2/1997 | Kubota et al. | ............... | 356/237.1 |
| 5,850,478 A * | 12/1998 | Suzuki et al. | ................ | 382/204 |
| 6,058,202 A * | 5/2000 | Yamaguchi | .................... | 382/112 |
| 6,619,166 B2 * | 9/2003 | Miyazaki et al. | ................. | 83/13 |
| 6,869,010 B2 | 3/2005 | Morson | | |
| 6,928,259 B2 | 8/2005 | Sakuma | | |
| 6,944,355 B2 * | 9/2005 | Lupien et al. | ................. | 382/275 |
| 2002/0051651 A1 * | 5/2002 | Yamada et al. | ................. | 399/81 |
| 2002/0083815 A1 * | 7/2002 | Whiteman et al. | ......... | 83/698.91 |
| 2002/0124699 A1 * | 9/2002 | Ishii et al. | .......................... | 83/35 |
| 2006/0227200 A1 * | 10/2006 | Rehmann | ....................... | 347/129 |
| 2007/0098248 A1 * | 5/2007 | Toyoda et al. | ................ | 382/145 |
| 2008/0279474 A1 * | 11/2008 | Venable et al. | ............... | 382/275 |
| 2010/0107844 A1 * | 5/2010 | Halden et al. | ................... | 83/628 |

* cited by examiner

*Primary Examiner* — Brian P Werner

(74) *Attorney, Agent, or Firm* — Philip E. Blair; Fleit Gibbons Gutman Bongini & Bianco P.L.

(57) ABSTRACT

What is disclosed is a novel system and method for determining which hole punch die is installed on a multifunction document reproduction device. A document scanner of a document reproduction system is used to scan a sample page that has been hole-punched by the presently installed punch die. The pattern of die holes on the punched test page is examined and compared to known punch die patterns. The method compares the current punch unit with bindings loaded in a hopper for the print/copy job. Information about the currently installed hole punch die is displayed on a graphical user interface so the user can confirm the print/copy job prior to the time of submission. The user can then accept the current hole punch configuration or change the unit to another before releasing their print/copy job. The method ensures that the selected punch pattern is compatible with other print/copy job finishing selections.

20 Claims, 14 Drawing Sheets

HOLE PUNCH DIE IDENTIFICATION IN A DOCUMENT REPRODUCTION SYSTEM

TECHNICAL FIELD

The present invention is directed to systems and methods for detecting and identifying a hole punch die currently installed on a document reproduction system.

BACKGROUND

Many print/copy jobs which are being performed in a document production environment require that the pages of the job be bound together in a manner specified by the customer. Many large print/copy production jobs require diverse bindings as part of the customer's requirements to produce financial reports, notebooks, professional surveys, sales presentations, cookbooks, calendars, to name a few. Such bindings are automatically added to the print/copy job. First, a die punches the appropriate number of holes in the right size, alignment, spacing, and configuration. The punched pages are then bound by a binder which threads the corresponding binding through the punched holes to finish the job and produce a final product for the customer.

To achieve this, a technician typically loads a hopper with the appropriate bindings desired by the customer and manually installs the correct automatic hole punching unit into the document reproduction device. As the print/copy job is run, the hole punch device aligns the job and uses a die to punch holes through the document pages. The punched pages are then provided to a binding unit which proceeds to thread the corresponding binding through the punched holes. Such machines tend to operate at high speeds with many device capable of binding upwards of 1000 units/hour. If, for instance, the holes were punched through the job by the wrong punch unit and the hopper is loaded with bindings for a different hole configuration, the binder will likely jam as it tries to thread a binding through misaligned holes. Such misalignment may cause the system to be off-line until the jam is cleared. Taking a document reproduction system off-line, even temporarily, to clear such jams reduces job throughput and adversely impacts productivity.

Many hole punch units generally comprise different dies each having their own punch layouts, # of holes, hole size, hole spacing, etc. Dies are often custom built by 3rd party providers and have limited interfacing capability with the print/copy systems wherein the die is installed. Further, many of the punch die sets are visibly similar and difficult to distinguish. As such, a technician has to manually open the device and visually examine the installed punch die to obtain, for example, a serial number or a code from the unit in order to determine which unit is presently installed on the device. Then, the technician has to determine whether the installed punch die is compatible with the binding in the binding hopper. This often involves referencing a manual of die serial numbers with various bindings to determine if the right die is installed for the selected binding. This can be a time consuming processes.

Accordingly, what is needed in this art are increasingly sophisticated systems and methods for identifying the hole punch die currently installed on a document reproduction device and for preventing the device from performing a print/copy job if there is a mismatch between the binding selected for the job and the installed die.

BRIEF SUMMARY

What is disclosed is a novel system and method for determining which hole punch die is currently installed on a document reproduction system. A document scanner is used to scan a sample page that has been punched by the presently installed hole punch die. The pattern of holes on the punched test page is examined and compared to known punch patterns retrieved from memory or storage. The user is provided with a notification as to the identity of the installed punch die. The method also compares the current punch die unit with bindings selected for the print/copy job. If there is a mismatch or incompatibility between the selected binding type and the installed hole punch die, the user is prevented from releasing their print/copy job to the device. The method advantageously ensures that the hole pattern of the installed punch die is correct for the binder element of the finisher.

In one example embodiment, the present method for identifying which hole punch die is presently installed on a multifunction device involves the following. The hole punch die currently installed on a multifunction device is used to punch or otherwise mark a pattern of holes on a test page. An image input device, such as a scanner, is used to scan the punched test page to obtain a digitized representation of the hole pattern marked thereon. The digital representation of the hole pattern of the scanned test page is compared with various hole patterns of known dies retrieved from memory or a storage device. If there is a match, then the installed hole punch die is identified, and the user is notified as to the identity of the installed hole punch die. If there is not a match, then the user is notified that the information about the installed hole punch die was not found to exist in the stored records, and the user is requested to enter information about the installed die. The entered information can then be added to the stored records of known hole punch dies for subsequent retrieval.

In another embodiment, information is received, from a user or a finishing device, regarding a binding type selected for the print/copy job intended to be performed on the multifunction device wherein the hole punch die is presently installed. Once the installed hole punch die has been identified, a determination is made, based on information contained in the retrieved record of the matching known die, whether the selected binding is compatible with the installed hole punch die. If not, then the user is notified that the selected binding is not compatible with the currently installed hole punch die. In one embodiment, the user is prevented from releasing their print/copy job to the multifunction device until the incompatibility has been resolved. In another embodiment, the multifunction device is prevented from operating while there is an incompatibility between the hole punch die installed and the selected binding type. Various other embodiments are provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for identifying which hole punch die is currently installed on a multifunction device. In an alternative embodiment, the present method ensures that the installed hole punch die is compatible with a selected finishing binder element.

It should be understood that one of ordinary skill would be familiar with many aspects of document reproduction and document finishing devices. Such an individual would perhaps be a key operator of a complex document reproduction system in a print/copy job production environment wherein various aspects of the present method find their uses. One of ordinary skill would also be knowledgeable about computer science and software and hardware programming systems and methods sufficient to implement the functionality described herein in their own document reproduction environments without undue experimentation.

An "image input device" is a device capable of capturing an image of a document. The set of image input devices is intended to encompass a variety of image capture devices such as, for example, scanners, cameras, photography equipment, facsimile machines, photo reproduction equipment, digital presses, copiers, and other image capture devices.

Figure 11:
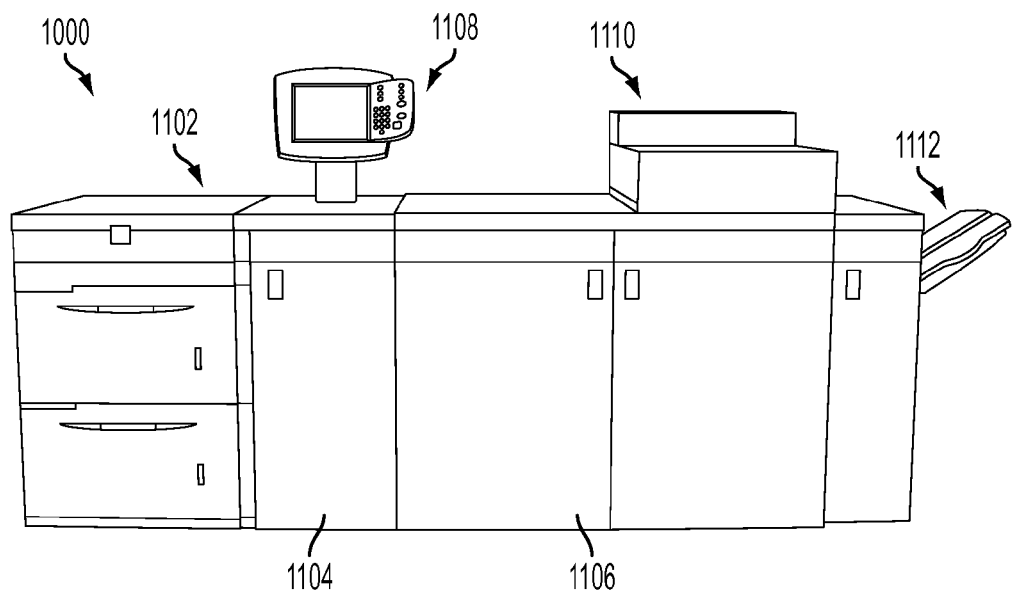
FIG. 11 shows a digital document reproduction device whereon one or more aspects of the present method will likely find their intended uses.

A "multifunction device" (or MFD), as used herein, broadly refers to devices known in the digital document reproduction arts which includes printers, presses, copiers and other xerographic systems, newspaper/magazine production machines, book publishing systems, and the like. The terms "document reproduction" and "document production" are used interchangeably. Most multifunction devices provide a graphical user interface (UI) for the display of data thereon. Many devices also provide a means for receiving a user input via, for example, a keyboard, keypad, mouse, and the like. Many sophisticated multifunction devices incorporate one or more document finishing systems and functions. Most MFDs can be arrayed in a networked configuration with other multifunction devices and computing workstations. One or more functions, features, and capabilities of a computing platform, as is generally known, may be integrated, in whole or in part, with a multifunction device or any device controller contained therein. One example multifunction device is the Xerox DocuColor Digital Press shown at 1100 of FIG. 11. The multifunction device of FIG. 11 includes a feeder module 1102 which feeds paper from a plurality of trays enclosed therein, a transport module 1104 which effectuates a movement of paper from paper trays to printing module 1106, and a user interface 1108, a dry ink/toner compartment 1110, and a catch tray module 1112 which receives the output printed documents.

A "finisher" (or "finishing device"), refers to a system which adds document finishing functionality, such as hole punching and binding, to a multifunction device. A finishing device may be a standalone unit or be incorporated, in whole or in part, with a multifunction device.

Figure 12:
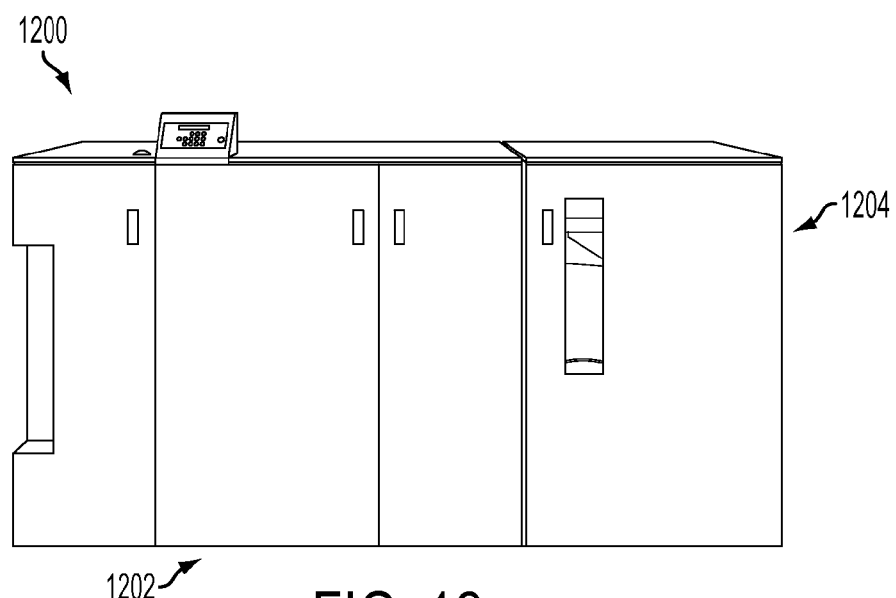
FIG. 12 shows a hole punching device capable of being docked to the digital document reproduction system of FIG. 11.

A "hole punch die" (or "hole punch unit") is an electromechanical device which punches a pattern of shaped holes along a long edge or a short edge of one or more sheets of a print/copy job. The hole patterns of FIG. 10 illustrate example die configurations available for the punch finisher of FIG. 12. It should be appreciated that the illustrated hole patterns of FIGS. 10A-D do not reflect sheet size limitations but instead are intended to provide a means for a visual examination of a given die set.

A "punch finisher" is a device which punches holes through printed pages using a die punch (or punch die). One such device is the GBC Fusion Punch II (1200 of FIG. 12) which docks to the Xerox DocuColor Digital Press of FIG. 11. The example punch finisher of FIG. 12 includes punching module 1202 wherein single sheets are punched in any of a variety of differing hole patterns (discussed herein further with respect to the hole patterns of FIGS. 10A-D) using a hole punch die. The offset stacker 1204 can stack up to 2,500 sheets. The example punch finisher of FIG. 12 can punch holes along the long edge of a 7"×10" (178×254 mm) sheet up to an 8.5"×11/A4 sheet or along the short edge of an 11"×17"/ (279 mm×432 mm)/A3 sheet.

Figure 13:
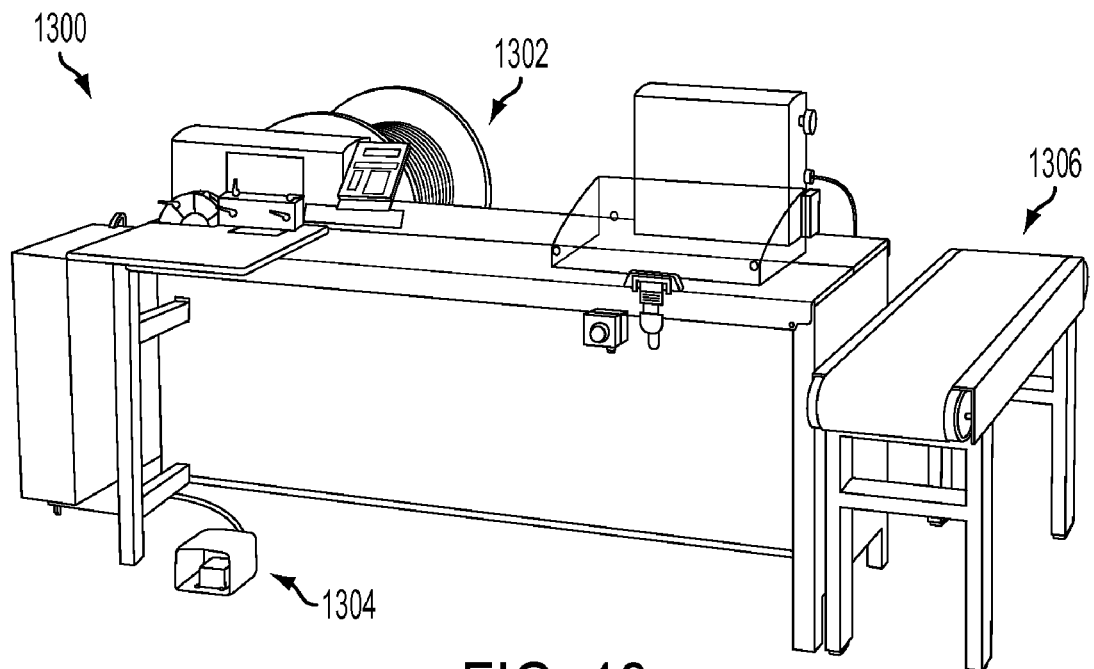
FIG. 13 shows a binding machine capable of performing a twin loop binding operation using a colored binding wire wound around a wire spool.
Figure 14:
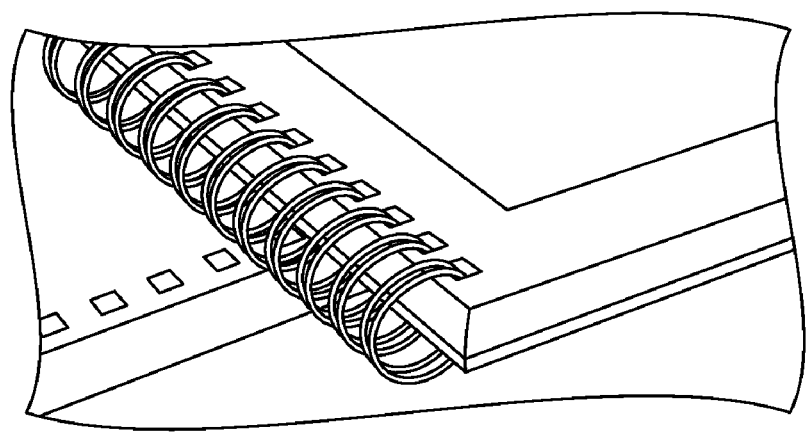
FIG. 14 illustrates an example print/copy job having been bound by the binding machine of FIG. 13 using a binding type referred to as "Twin Loop"

A "binding finisher" is a device which threads or inserts a selected binding element through or into a pattern of holes punched through the pages of an output print/copy job. A print/copy job can be bound by a finisher using any of a variety of bindings such as coil, wire, velobind, plastic comb, etc. One example binding finisher which performs a "Twin Loop" binding shown in the bound print/copy job of FIG. 14 is the GBC Semi-Automatic Wire Binding Machine of FIG. 13. The binding finisher 1300 utilizes a wire spool 1302 of colored wire, a foot pedal control 1304 for controlling the operation of the machine by an operator thereof, and an output conveyor 1306 for stacking and movement of the bound print/copy job product. The binding finisher of FIG. 13 threads the binding wire element from the wire spool through a pattern of holes at a rate of up to 1000 units/hour.

Wire Binding, also known as Twin Loop, Double Loop, Wire-O, Double-O, or WireBind, involves a "C" shaped wire spine being squeezed into a round shape using a wire closing device. This type of binding uses either a 3:1 pitch hole pattern (3 holes per inch) or a 2:1 pitch hole pattern (2 holes/inch). The 3:1 pitch hole pattern is used for smaller books that are up to $\%_{16}$" in diameter. The 2:1 pitch hole pattern is normally used for larger books as the holes are slightly bigger to accommodate a thicker, stronger wire spine. Once punched, the wire is placed through the holes. The binder holds the book and inserts the wire into a "closer" that crimps the wire closed and into a rounded shape.

Plastic Comb, also known as GBC Binding or Ibico Binding, inserts a plastic comb spine through a plurality of typically rectangular holes. Round "comb" spines (with 19 rings for US Letter size or 21 rings for A4 legal size) are threaded through a plurality of slits in the plastic spine to lock the bound sheets together. Standard comb sizes range from $\frac{3}{16}$" combs for 10 sheets of 20# paper and up to 2" combs for binding up to 400 sheets. Spine lengths are cut match the length of the paper. The rings on the spine open and insert into the punched holes then rest against the body of the spine, resulting in a closure that can be opened again. Plastic Comb Binding allows a document to be disassembled and reassembled without damage.

VeloBind uses a hard plastic strip to lock pages of the document in place. A series of pins attached to a plastic strip feeds through the punched holes and then goes through another plastic strip called the receiving strip. The excess portion of the pins is cut off and the plastic is heat-sealed to create a flat binding. VeloBind provides a more permanent bind than Plastic Comb Binding.

Spiral binding, or Coil Binding, threads a wire helix (spring-shaped) through a plurality of punched holes to provide a flexible hinge at the spine such that the document will lay flat when opened. Spiral coil binding utilizes a number of different hole patterns. The most common hole pattern is a 4:1 pitch. Spiral coil spines can also be used with 3:1 and 5:1 pitches and 0.400" hole patterns.

Plastic Coil, also known as color coil, plastikoil, and coilbind, uses punching and inserting equipment made to accommodate plastic coils. This binding style is durable and gives the finished product the ability to lie flat when opened.

Figure 1:
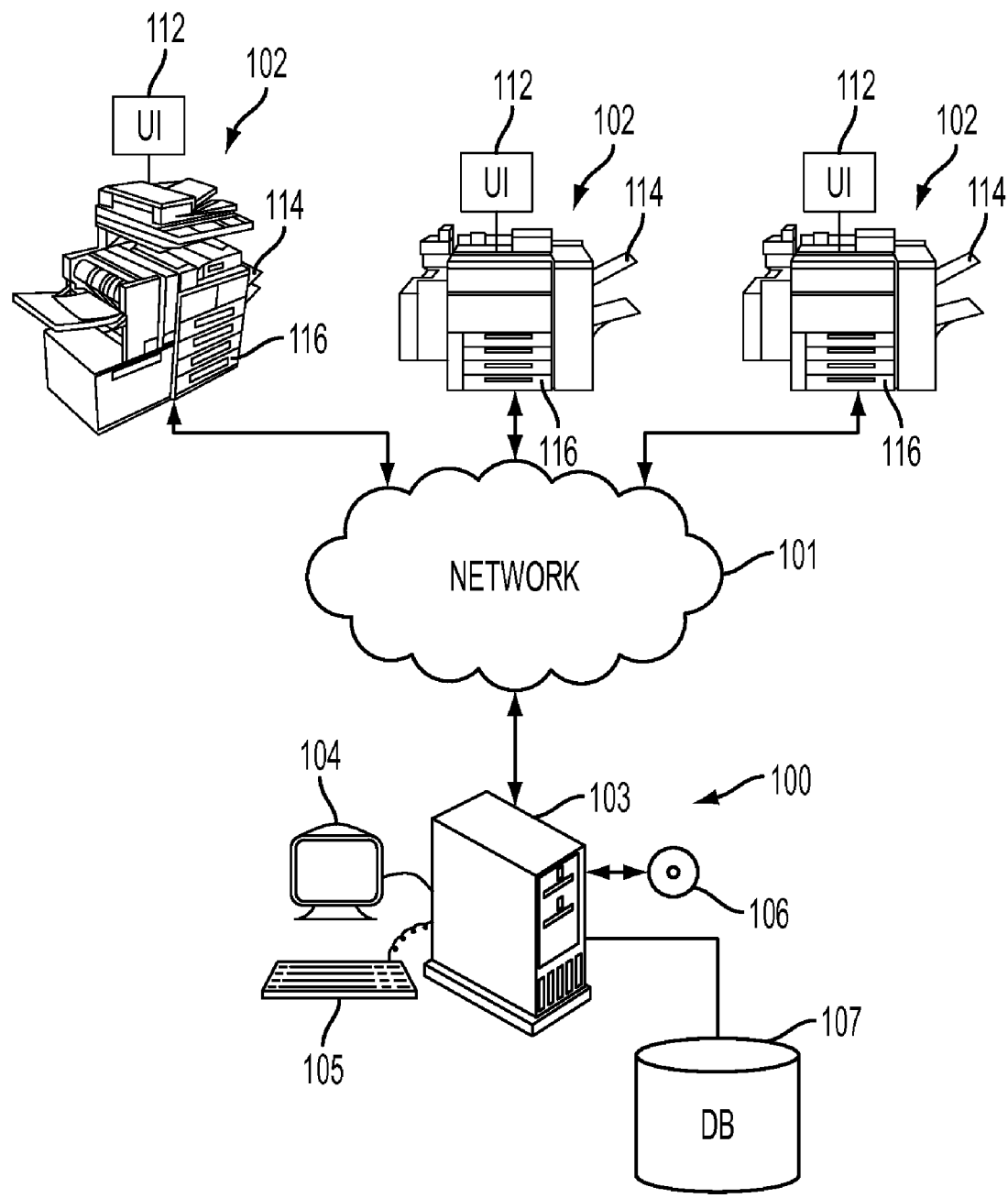
FIG. 1 illustrates an example networked document reproduction environment wherein one or more aspects of the present method may find their intended uses.

Reference is now being made to FIG. 1 which illustrates one embodiment of a networked document reproduction environment wherein one or more aspects of the present method are likely to find their intended implementations.

In FIG. 1, the example networked document reproduction environment is shown generally comprising a computer system 100 connected to various multifunction devices 102 over network 101. Such a networked environment may be wholly incorporated within the confines of a single print/copy center or may be distributed to different locations throughout an enterprise network. Techniques for placing computers in network communication with digital devices are well established. Therefore, a discussion as to specific techniques for placing systems and devices in networked communication is omitted. The multifunction devices 102 of FIG. 1 are intended to be illustrative of any of the Xerox DocuColor Digital Press of FIG. 11, and/or the digital document reproduction system of FIG. 15, whether separately or docked with any of the punch finisher of FIG. 12 and/or the binding finisher of FIG. 13. Computer platform 100 is in digital communication with a plurality of multifunction devices (MFDs) 102 over a network illustrated as amorphous cloud 101. Many aspects of network 101 are commonly known and may include the World Wide Web or Internet. Further discussions as to the construction and/or operation of a specific network configuration or the Internet per se have been omitted for brevity. Suffice it to say, data is transmitted over the network in packets via a plurality of communication interfaces using established protocols. Data is transferred in the form of signals which may be, for example, electronic, electromagnetic, optical, light, or other signal forms. These signals may be transported via a wire, cable, fiber optic, phone line, cellular link, RF, satellite, or other signal medium or pathway.

Computer 100 is shown comprising a case 103 housing therein a motherboard, central processing unit (CPU), memory, various interfaces, a storage device, and a communications link such as a network card. System 100 also includes display 104 such as a CRT or LCD. Alphanumeric keyboard 105 and a mouse (not shown) provide a means for a user input. Also shown is computer program product 106 containing machine executable instructions and other program instructions for implementing various functionality of the present method. Computer platform 100 includes database 107 for storage and retrieval of data. The computer platform is capable of running server software (or housing server hardware) for hosting installed applications. Server software capable of hosting service applications are readily available from a variety of vendors. The computer platform may be further capable of creating and running service proxies for directing requests for applications from a client device to the platform hosting the requested application and for redirecting responses from a host device to a requesting client device. The computer platform may act as a server to one or more processors resident on a circuit board residing within one or more of the MFDs 102. Computer 100 is capable of receiving, over network 101, a digitized representation of an image of a document which has been scanned by any of the MFDs 102 and executing machine readable program instructions for performing one or more aspects of the present method. Special purpose program instructions loaded thereon cause a central processor unit (CPU) to make one or more comparisons and determinations discussed with respect to the flow diagrams hereof.

In the embodiment shown, computer system 100 implements database 107 wherein various records containing text and/or images of hole patterns of known hold punch dies are stored. Although the database is shown as a external device, the database will likely be internal to case 103 and mounted on the hard disk drive unit contained therein. Records stored in the database can be retrieved, modified, and updated by computer 100 or, additionally, by any of the multifunction devices 102 in communication with the database over network 101. A record is intended to mean any data structure capable of containing information (text, graphic, audio, video, etc.) which can be indexed, stored, searched, and retrieved by a database engine in response to a query. A record can be configured though a software construct to contain one or more fields. Such constructs are well established in the software arts. The database is one known in the arts. Since database operation, query optimization, and methods of record retrieval are well known, further discussion as to a specific database, or the implementation thereof, has been purposefully omitted for brevity. One of ordinary skill should readily be able to acquire through commerce, and implement a database in their own networked environments sufficient to store, modify, and retrieve records in response to a query in accordance with the teachings hereof.

Multifunction devices 102 are shown including a graphical user interface (GUI) 112 for the display thereon of icons and other selectable menu options and information. The GUI includes a display and may further include any of a keyboard, keypad, touchpad, and/or a mouse. A display on the multifunction device is one of many possible displays retained in a memory associated with a user interface, including device-specific program instructions for instructing the processor control unit to configure the device to perform one or more aspects of the present method and/or to electronically scan the punched test page and send the scanned image to a destination device in communication therewith over a network. The user interface includes controls for programming a range of values for carrying out various embodiments of the present method. The user interface further includes controls for programming system settings to configure any of the networked multifunction devices to perform various aspects of the present method. The multifunction devices 102 include tray 114 for document input, and trays 116 for retaining a variety of print media. Such devices are capable of performing a print/copy job as is generally known in the document reproduction arts. One or more of the multifunction devices further incorporates a functionality which enables the device to retrieve one or more records from either a local memory, local storage, or from a remote storage device over network 101.

The computer platform and the multifunction devices each includes a network interface card (not shown) which facilitates the transmission of data over network 101. Any of the networked devices may include an Ethernet or similar card to connect to network 101 using, for example, a modem. Typical network interface cards found in the arts also enable one or more of the functionality of, for example, general purpose systems such as POTS (Plain Old Telephone System) and Integrated Services Digital Network (ISDN) and/or special purpose networking systems such as a Local Area Network (LAN) and Wireless Area Network (WAN).

Figure 2:
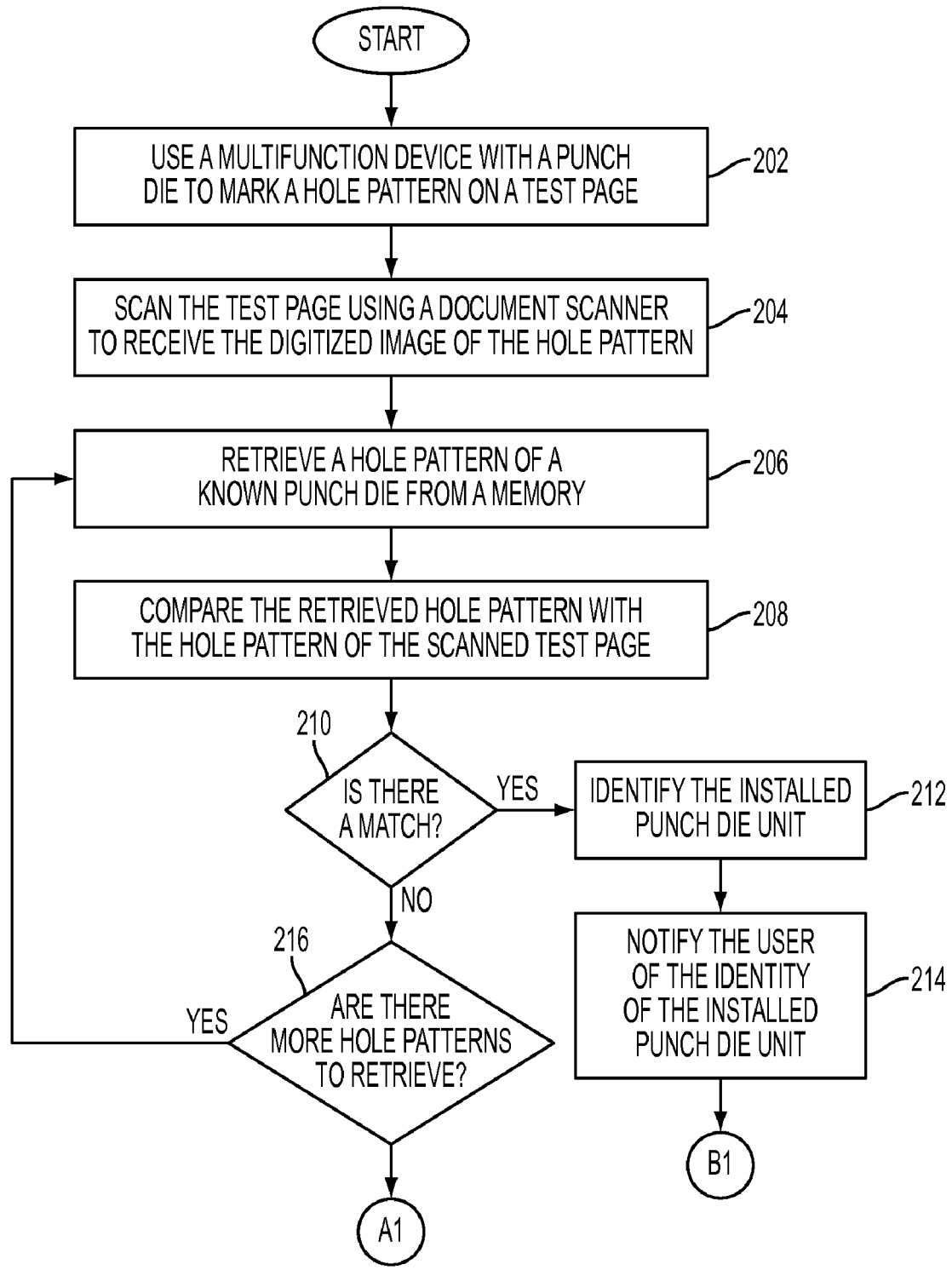
FIG. 2 illustrates a flow diagram of one example embodiment of the present method for identifying a hole punch die currently installed in a multifunction device.

Reference is now being made to the flow diagram of FIG. 2 which illustrates one example embodiment of the present method for identifying the presently installed hole punch die.

At 202, the hole punch die currently installed on a multifunction device is used to punch or mark a pattern of holes on a test page. Preferably, the test page is a blank piece of paper oriented in such a manner that the proper edge (long edge or short edge) of the page is marked by the punch die. This is a relatively easy step to perform requiring only that a key operator of the multifunction device send a single page through the device and then retrieve the marked (or punched) page from the output tray. Depending on the capabilities of the multifunction device whereon the punch die is presently installed, the key operator can initiate the marking of a single page either from a user interface associated with the multifunction device or from a remove workstation such as computer 100 of FIG. 1 over network 101. One example output hereof is the marked test page of FIG. 6 which has been punched by punch die unit 1002 of FIG. 10C to produce the hole pattern shown thereon.

At 204, an image input device is used to obtain a digitized image of the hole pattern on the test page marked by the installed punch die unit in step 202. In one embodiment, the image input device is a scanner as is generally well known in the arts. A scanner is an image input device that optically scans a document to obtain a digitized image thereof. Common scanning devices incorporate specialized receptors which move beneath a platen and scan the media placed thereon using reflected light. Scanners typically incorporate a Charge Coupled Device (CCD) or a Contact Image Sensor (CIS) as the image sensing receptors. A digital signal of the digitized document is produced by the image receptors which contains information about the image such as pixel color, color intensity, pixel location, and the like. Pixel values can thereafter be converted to any of a variety of color spaces such as L*a*b* or RGB and manipulated accordingly. Alternatively, an image of the hole pattern marked on the test page is obtained using an image capture device. The signal of the digitized test page can be sent over the network to a computing platform whereon one or more steps of the present method are preformed. In one embodiment, instructions are provided to the user on the display of FIGS. 8A-B and 9A-B as to which orientation to place the punched test page on the platen of the image input device prior to scanning the test page such that the page is scanned with the hole pattern properly aligned along a pre-determined orientation. Alternatively, the scanned image is digitally rotated in memory to a desired orientation by specialized hardware or software.

At 206, a first hole pattern of a known punch die is retrieved from a memory. The hole patterns of known punch dies are retrieved from memory or from a local or remote storage device. One example illustration of a plurality of records stored in a database 107 of FIG. 1 is shown and discussed herein further with respect to the embodiment of FIG. 7. The records are either retrieved serially and compared to the hole pattern of the digitized test page or are all pre-loaded into memory for subsequent retrieval and use.

At 208, the image of the hole pattern of the scanned test page is compared against the retrieved hole pattern of a known punch die. Software routines or a graphics processor manipulates the two images for comparison purposes. Such manipulation may take the form of a resizing, rotation, coloring or color removal, background and other content manipulation and/or removal, and the like. Alternatively, the two images are compared using any of a size, shape, and location of any holes of the pattern to determine a match. Such a implementation requires that measurements be made of various aspects of the holes in the pattern. Many techniques for performing an image comparison are known. For example, one method for comparing two images is to rotate the images so they are aligned along a common axis or orientation and then perform a pixel-by-pixel comparison while looking for their differences. Another method is to take a difference between the two images and calculate a bounding box of the non-zero regions in the difference image. If the images are identical, most pixels in the difference image will be zero. Another way to compare two images is to calculate a root-mean-square (RMS) value of a histogram of the difference between the images. If the images are identical, the RMS value of the difference histogram is zero or close to zero. A threshold method returns true if no pixel difference between the two images exceeds a defined threshold value, and false otherwise. Note that differences are measured in a sum of squares fashion (vector distance). A threshold count method works similar to a threshold-based method but, instead of immediately returning a false value as soon as it finds a pixel pair whose difference exceeds the threshold, it counts the number of pixel pairs that exceed that threshold and returns that count. The count is used to determine whether the two images are close enough to be considered a match. The average threshold method returns true if the average difference over all pixel pairings between the two images is under a given threshold. Two different average types are typically employed: median and mean. What this means precisely may differ from comparator to comparator, but is at least predictable. Methods for comparing two images are well established in the pattern analysis and image recognition arts. Because methods for performing a comparison of two images vary widely and are, in many respects, dependent on the hardware environment wherein such methods are implemented, a further discussion as to a specific method is omitted. The reader is respectfully directed to: "*Handbook of Computer Vision Algorithms in Image Algebra*", CRC Press, 2nd Ed. (2000), ISBN-10: 0849300754, ISBN-13: 978-0849300752, wherein image comparison is discussed in further detail. The reader is also respectfully directed to "Image Processing Lab in C#" which is a software toolset that is available for download from the Internet under a GNU General Public License (GPL). The software toolset provides relatively easy algorithms useful in performing image comparisons. Note that, one or both of the images being compared may have to be rotated, in memory, to a pre-determined orientation in advance of their comparison. Additionally, MATLAB is a numerical computing environment and programming language maintained by MathWorks. MATLAB provides algorithms for performing matrix manipulation, plotting functions and data, creation of user interfaces, and interfacing with programs in other languages. An optional toolbox incorporates a symbolic engine allowing access to algebraic capabilities. Various other software tools are available such as "Image Comparer" by Bolide Software which finds differences between images.

With reference still being made to the flow diagram of FIG. 2, if there is a match as a result of the comparison (step 208) of the hole pattern of the test page and the retrieved hole pattern of a known punch die then, at 210, the installed hole punch die is identified based on the record of the matching known punch die. Such identification information is obtained from the record of the matching known die punch. Alternatively, upon a determination that a matching hole punch pattern is found, one or more other fields of information are downloaded from a remote device over a network connection. Methods for retrieving data fields contained in a stored record or referencing data stored remotely are well known in the field of computer science.

Once the identity of the installed punch die is obtained then, at 214, the user is notified of the identity of the matching punch die. Notifying the user (or key operator) can take the form of, for example, displaying the retrieved information about the installed punch die on the user interface (FIGS. 8A-B and 9A-B). Alternatively, the identification information is transmitted over a network to a computer workstation whereon the identity of the punch die is displayed. Notification may further involve initiating an audible sound which provides an indication to the user about an identity of the installed hole punch die or that no matching punch die was found. Such a notification may take the form of a canned audio message or, for instance, a bell tone or a sonic alert being activated. Notifying the user may also involve initiating a visible light which provides an indication to the user about the identity of the installed hole punch die, such as for instance, a blinking green light. The user may be notified by, for instance, a blinking red light in the event that no matching punch die was found. Notification may be made by communicating a text or email message to the user about the installed hole punch die or the lack of a match. The communicated message can be a text, audio, and/or video message. In the embodiment, of FIG. 2, once the key operator (or user) has been notified of a matching record having been found and the information displayed, processing continues with respect to node B1 of FIG. 3 wherein further processing stops.

If, at 210, the retrieved hole pattern does not match the hole pattern of the test page then, at 216, a determination is made whether more hole patterns can be retrieved for comparison purposes. If so, then processing process back to step 206 wherein the next hole pattern of the next known punch die record is retrieved from memory or storage for comparison purposes. Otherwise, processing proceeds with respect to node A1.

Figure 3:
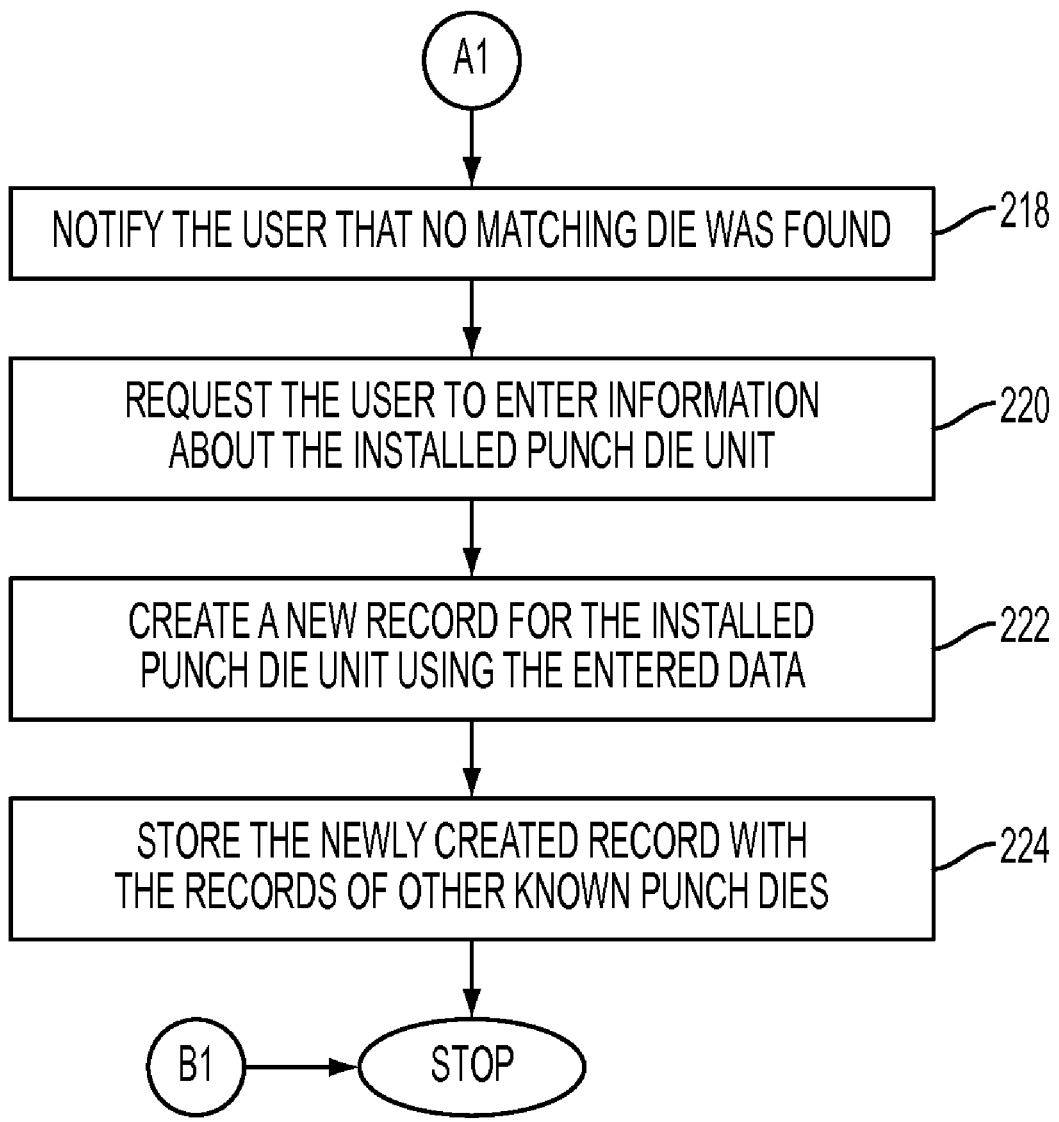
FIG. 3 is a continuation of the flow diagram of FIG. 2 with processing continuing with respect to nodes A1 and B1.

Reference is now made to FIG. 3 which is a continuation of the flow diagram of FIG. 2 with processing continuing with respect to nodes A1 and B1.

If there is not a match (at 210) and no more hole patterns of known punch dies remain to be retrieved (at 216) then, at 218, the user is notified that the information about the installed hole punch die was not found to exist. Such notifications can take the form of the notification methods discussed with respect to the notification of step 214 discussed above.

At 218, the user is notified that no matching hole punch die was found. At 220, the user is requested to enter information about the installed punch die unit. The key operator (or user) can enter information which identifies the currently installed punch die unit using the example menu options of the graphical user interface of FIGS. 8A-B and 9A-B. The key operator may enter information about a punch die at the time the die unit was received from a die manufacturer or representative thereof. The key operator may receive an electronic record containing all the identification information about the newly received die including an image of the die pattern to be used for comparison purposes. The electronic record can then be uploaded into the device and displayed as default settings for the key operator on a user interface.

At 222, the entered information about the installed die is added to a new record. At 224, the newly created record is stored along with the other records of known punch dies. An image of the hole pattern of the new die can also be uploaded or obtained by the operator by using the die to punch or mark a blank page and then scanning the marked test page to obtain a digital image of the hole pattern produced by the newly received die. The scanned image would then be stored as part of the new punch die's record in a manner discussed with respect to FIG. 7. In such a manner, the number of records stored about known punch dies expands as new dies are added to inventory. Thereafter, processing stops.

A second embodiment will next be discussed which further checks the compatibility of the installed die with a binding element selected for the current print/copy job intended to be performed on the multifunction device. The user is prevented from releasing their job to the multifunction device if the installed punch die is determined to be incompatible with the selected binding element.

Figure 4:
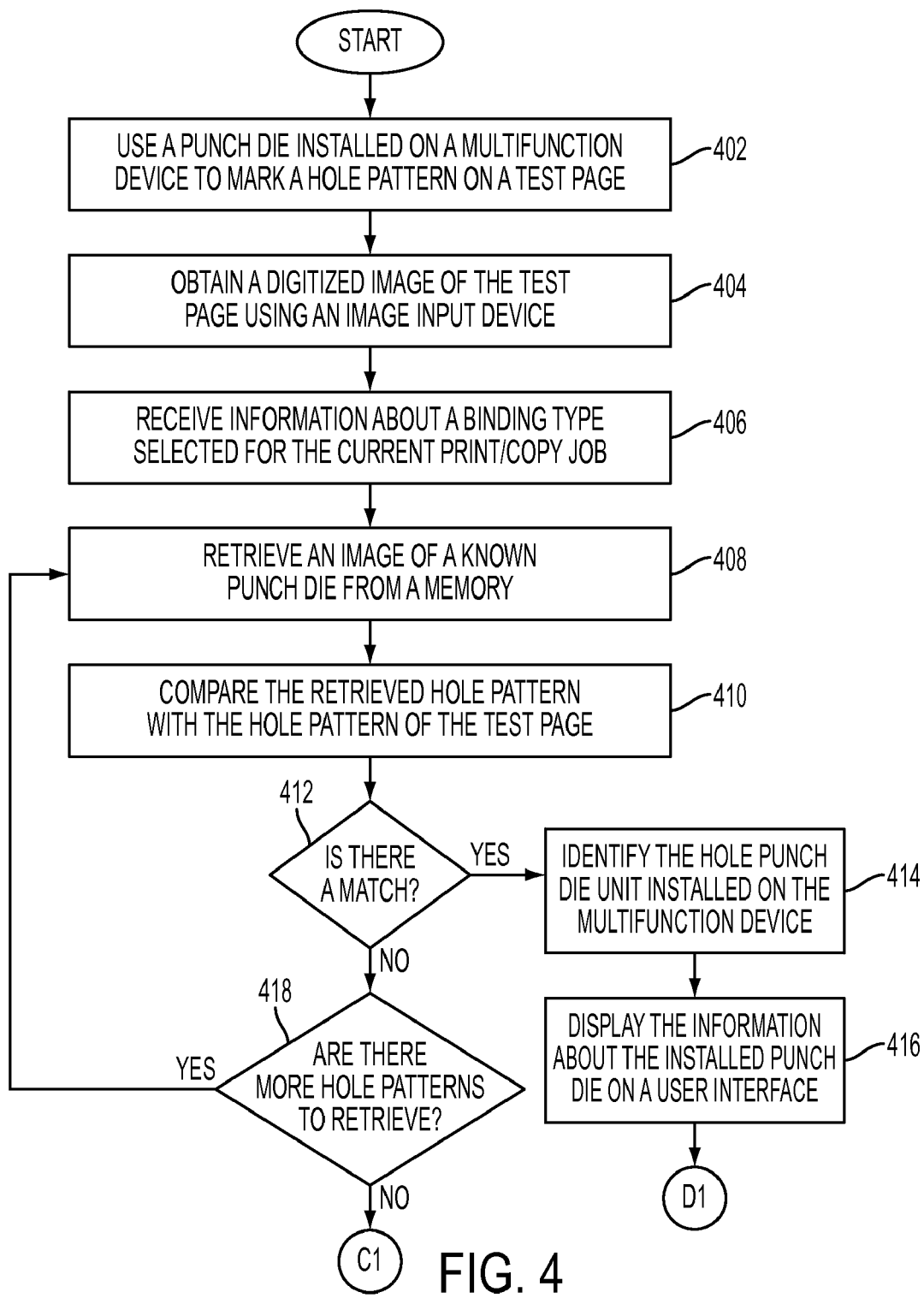
FIG. 4 illustrates a flow diagram of another embodiment of the present method for determining whether a hole punch die installed on a multifunction device is compatible with a binding type presently loaded in a hopper of a binding machine.

Reference is now being made to the flow diagram of FIG. 4 which illustrates another embodiment of the present method for identifying a hole punch die installed on a multifunction device. Duplicative explanatory discussions of steps which are similar to that of the flow diagram of FIGS. 2 and 3 have been omitted for brevity. If further explanatory detail is desired, the reader is respectfully directed to the explanatory text of similar steps described with respect to the flow diagram of FIGS. 2 and 3.

Figure 6:
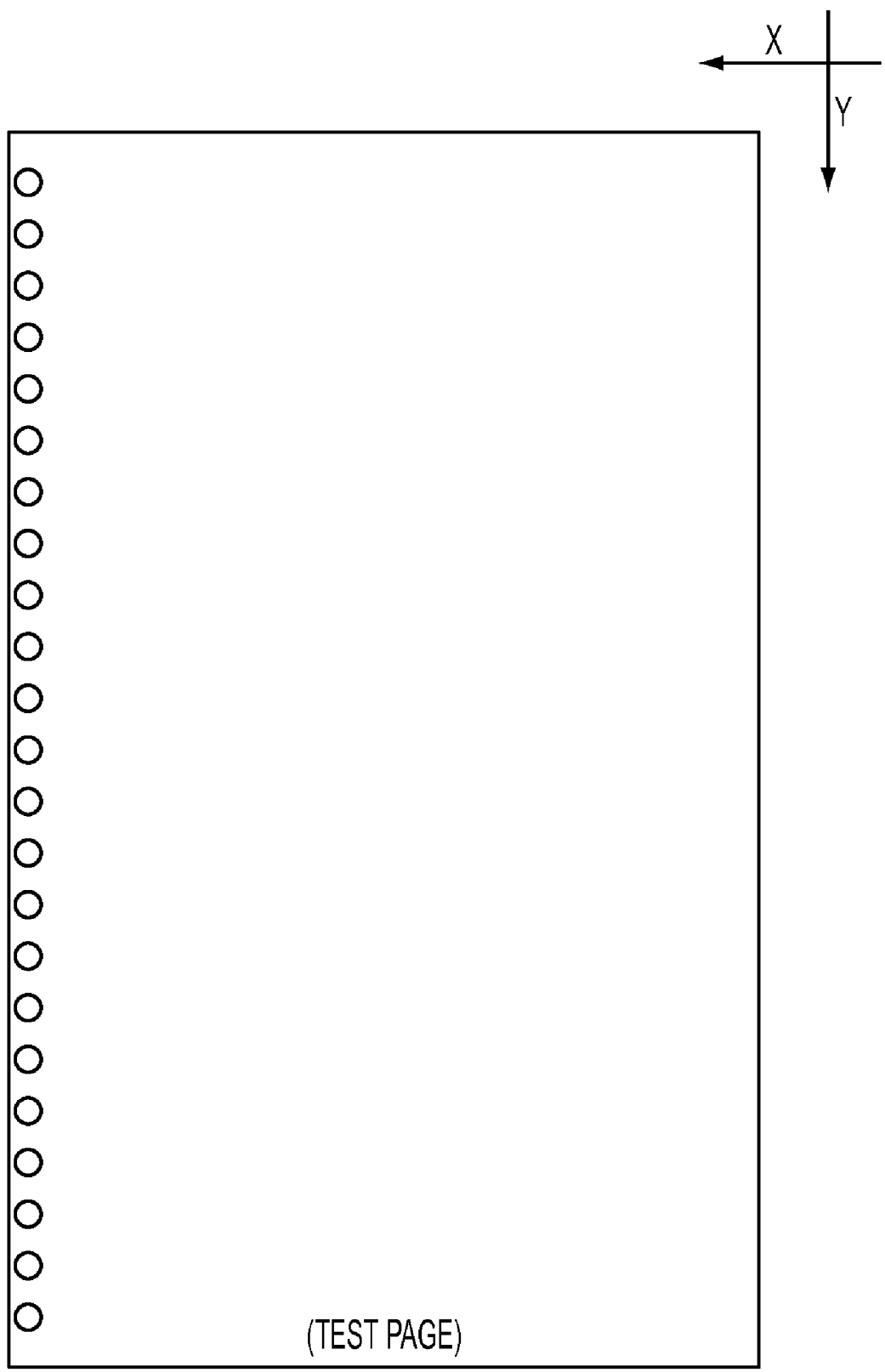
FIG. 6 illustrates an example test page having been "marked" by the hole pattern of punch die 1002 of FIG. 10C.

At 402, the hole punch die installed on a multifunction device is used to punch (or mark) a hole pattern on a test page. The key operator performs this step by sending a single test page through the multifunction device whereon the unknown hole punch die is installed. The punched test page is then retrieved from an output tray of the multifunction device. An example retrieved test page having been punched by the punch die unit (1002 of FIG. 10C) is shown in FIG. 6.

At 404, a digitized image of the test page containing the punched hole pattern is received using an image input device. In one embodiment, the digitized image of the test page is obtained from a scanning device, such as a flatbed scanner which scans the test page into digitized form. The scanned image may be rotated in a memory to a pre-determined orientation in order for the image comparisons to be performed.

At 406, information about a binding type selected for the current print/copy job to be performed by the multifunction device is received. In this embodiment, the key operator has knowledge of or has already pre-selected a binding such as the twin loop binding (of FIG. 14) to be used for the current print/copy job. Typically, the operator loads the hopper with selected bindings or, for example, prepares a wire spool for use with the finisher, and then enters information about the selected binding into a user interface of the multifunction device. The hole pattern of the punch die used for this job must correspond to the configuration of the selected binding element. If there is a mismatch between the hole pattern and alignment expected by the binding finisher and the hole pattern punched in the pages of the print/copy job, then the finisher will likely jam as it tries to thread the binding element through misaligned holes and the document reproduction system may have to be taken off-line until the jammed bindings and damaged pages of the job are cleared.

At 408, an image of a hole pattern of a known punch die is retrieved from memory. The record associated with the known punch die can alternatively be retrieved from local storage or from a remote storage device over a network.

A 410, the retrieved hole pattern is compared with the hole pattern of the test page. Methods for comparing two images are discussed with respect to the comparing step 208 of the flow diagram of FIG. 2. At 412, if the comparison results in a match having been found then, at 414, the installed hole punch is identified from information retrieved from the stored record associated with the matching punch die. Then, at 416, the information about the installed punch die is displayed on a user interface for the key operator in a manner as previously discussed. Thereafter, processing proceeds with respect to node D1 of FIG. 5. Otherwise, at 418, a determination is made whether more records of hole patterns of known punch dies remain to be retrieved for comparison purposes. If so, then processing continues with respect to step 408 wherein the next record of the hole pattern of a next known punch die is retrieved.

Figure 5:
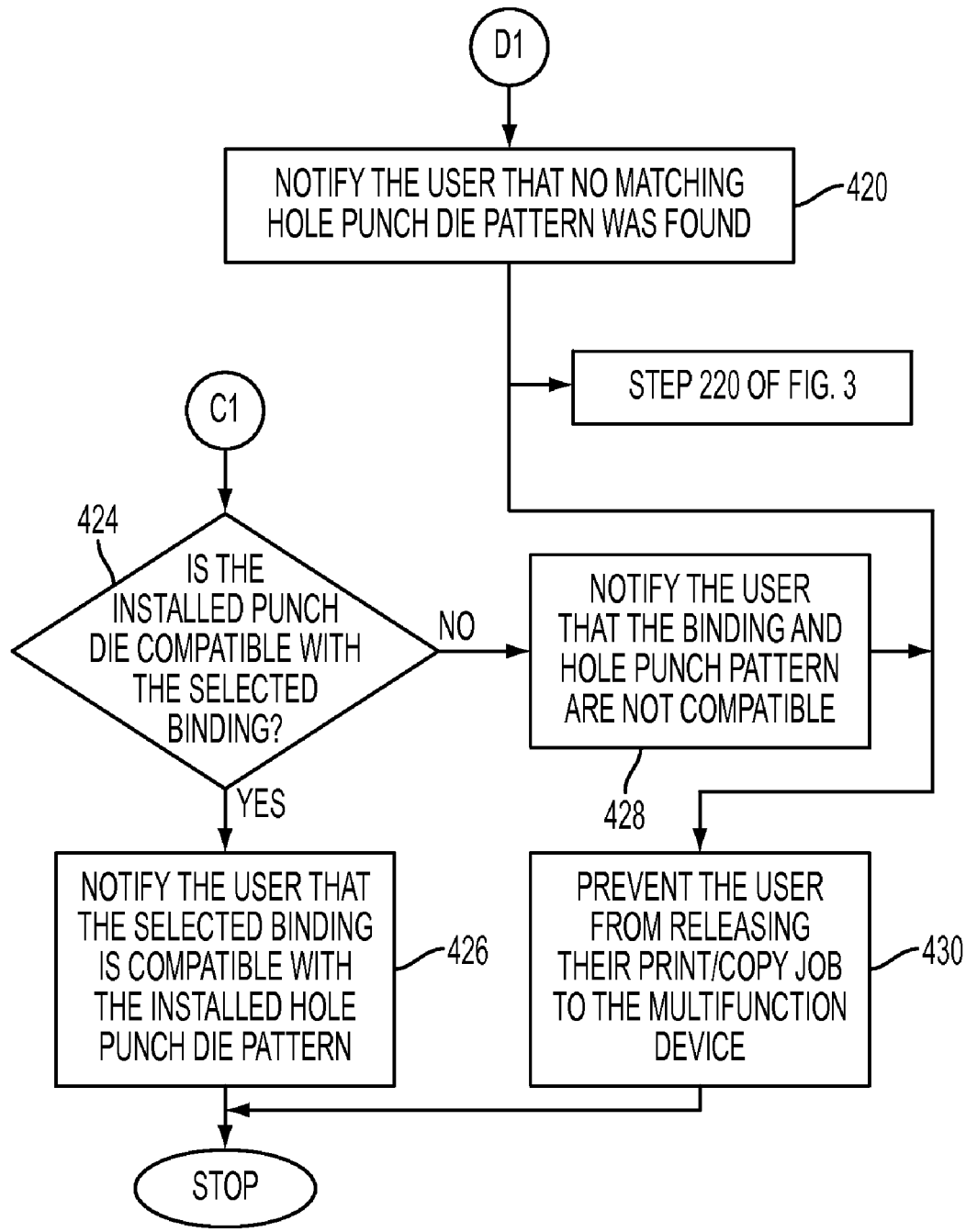
FIG. 5 is a continuation of the flow diagram of FIG. 4 with processing continuing with respect to nodes C1 and D1.

Reference is now made to the flow diagram of FIG. 5 which is a continuation of the flow diagram of FIG. 4 with processing continuing with respect to nodes C1 and D1.

If, at 412, no matching punch dies were found and if, at 418, no more hole patterns remain to be retrieved for comparison purposes then, at 420 the key operator is notified that no matching punch die was found. Optionally, the key operator is queried to enter information about the hole punch die and a record of the entered information created and stored along with the other stored records of known punch dies in a manner as shown and discussed with respect to step 220 of FIG. 3. At 430, the operator is prevented from releasing their print/copy job to the multifunction device. Thereafter, further processing stops until the incompatibility issues between the installed hole punch die pattern and the selected binding type have been resolved.

If, at 412, a matching punch die hole pattern was found then, at 424, a determination is made whether the selected binding is compatible with the identified hole punch die. This step involves a comparison being performed between the binding element loaded in the hopper of the binding machine as entered by the key operator and the information retrieved about the currently installed punch die. The record of a given punch die contains a listing of bindings which are compatible with the hole pattern of that particular die. This determination then is made by simply searching the list of compatible bindings for the installed punch die to find if the selected binding type is on the list. If so, then the binding selected for the print/copy job is compatible with the installed punch die. If it is compatible then, at 426, the user is notified that the selected binding is compatible with the currently installed hole punch die pattern and further processing stops. Otherwise, if the installed hole punch die is not compatible with the selected binding, at 428, the user is notified that the selected binding is incompatible with the installed hole punch die pattern. In this embodiment, a notification can take the form of a blinking red light or an audible warning alert being sounded, as discussed with respect to the notification step of the flow diagram of FIG. 3.

At 430, the user is prevented from releasing the print/copy job to the document reproduction system or from selecting a hole punch finishing option until the incompatibility between the installed hole punch die and the selected binding element has been resolved to the satisfaction of the key operator of the multifunction device. Thereafter, further processing stops.

Depending on the sophistication of the multifunction device whereon the present method is implemented, one or more system functions can be activated, many via software libraries, which prevent the multifunction device from executing or otherwise performing the current print/copy job until the incompatibility issue has been resolved. One such implementation involves temporarily de-activating a START button on a user control panel of the multifunction device. Since such software routines are system specific and designed to interface, often through software routines and system library calls interfacing with one or more device controllers on a given document reproduction system, a discussion as to a particular implementation is omitted. One of ordinary skill, such as a device designer or system software developer would be sufficiently knowledgeable to temporarily de-activate their own multifunction device or prevent the user from releasing their print/copy job to the device based on a result of the above-discussed comparisons.

Figure 7:
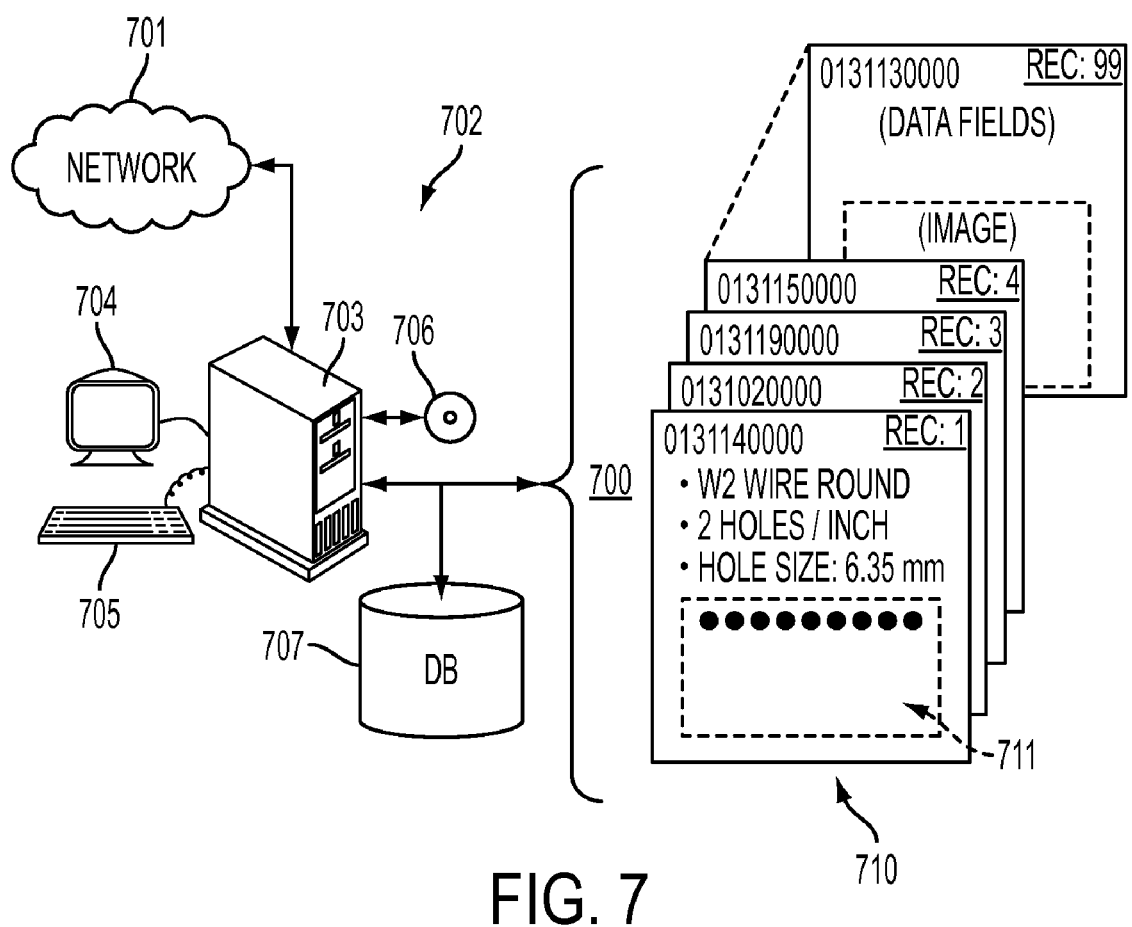
FIG. 7 illustrates a plurality of records stored in the example database of FIG. 1 and containing, at least in part, images of hole patterns of known punch dies retrieved from storage and used for comparison purposes in a manner in accordance with the flow diagrams of the embodiments of FIGS. 2 and 4.

Reference is now being made to the embodiment of FIG. 7 which illustrates a plurality of records containing information about the example known punch dies (of FIGS. 10A-C) stored in database 107 of the computer workstation 100 of the networked print/copy job environment of FIG. 1.

An example plurality of records, collectively at 700, are stored in database 707 which is placed in communication with computer 702 and network 701. The example computer system shown has a computer readable medium 706 for storing machine readable instructions for implementing various aspects hereof and for storing or otherwise transferring records of known punch dies to/from the computer platform 702. In the illustration, there are 99 records in sequential order. It should be appreciated that the number of stored records is intended to be illustrative for explanatory purposes. Each of the records associated with each of the known punch dies has a numerical sequence associated therewith. This sequence is preferably unique to each die and thus can be used for die identification purposes. It can also be used for indexing the records, record identification, and for fast record retrieval using for instance a hashing technique well known in the arts. Alternatively, it can be a randomly generated alphanumeric character sequence which is then associated with the current record and created at the time the record is created, indexed, and stored.

Figure 10A:
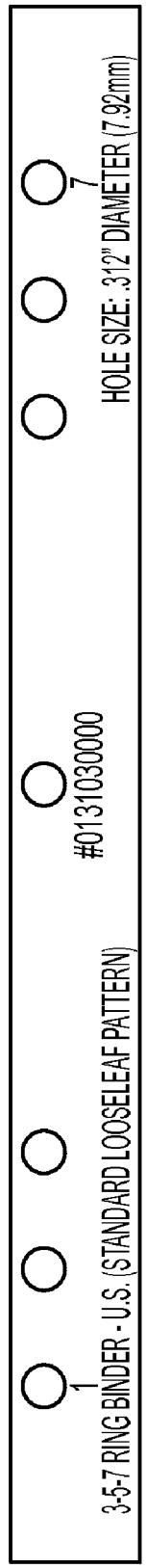
FIGS. 10A-D show a plurality of die set configurations available for the hole punching device of FIG. 12.
Figure 10B:
Figure 10B:
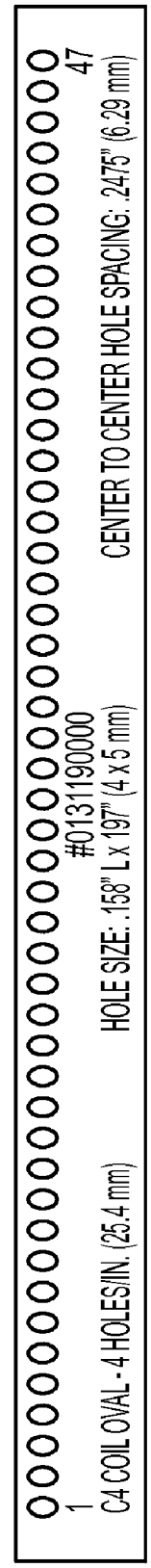
Figure 10C:
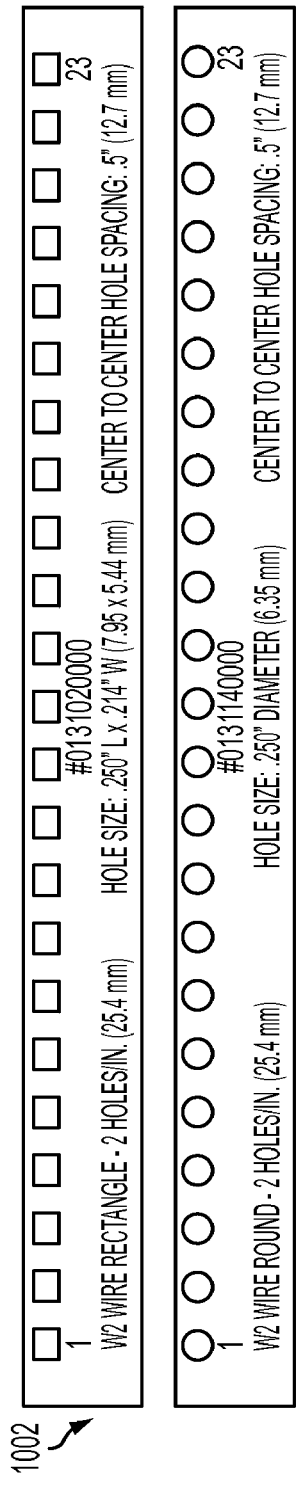
Figure 10C:
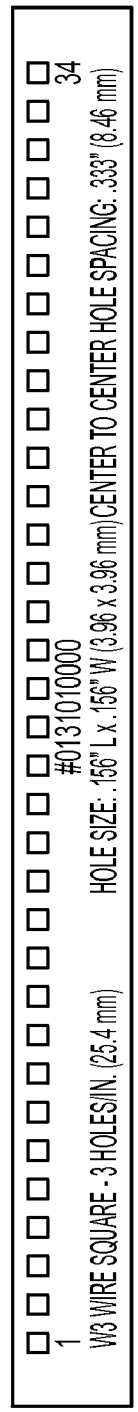
Figure 10D:
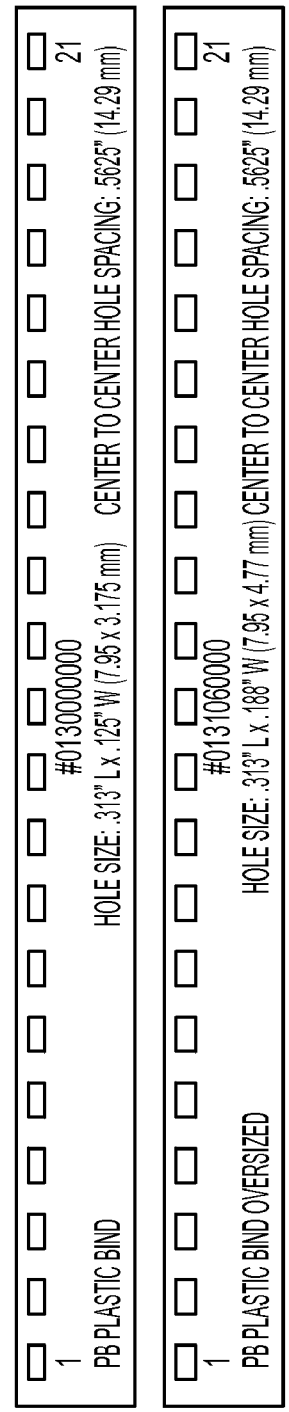
Figure 10D:
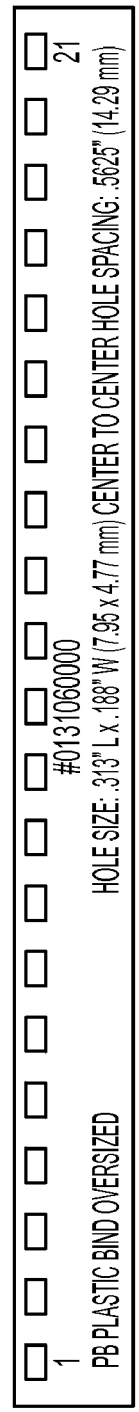

The numerical sequence at the top of example record 710, is coded string "0131140000", corresponds to the serial number of the punch die pattern (1002 of FIG. 10C). This particular die pattern (1002) is "W2 Wire Round" as indicated, which is compatible with a "Twin Loop" Binding selection. This die pattern has a hole pattern with a hole spacing of 2 holes/inch and the holes are each 6.35 mm in diameter. Record 710 further stores an image 711 of the hole pattern of the die (1002). This image is used for comparison purposes with the die pattern punched or otherwise marked on the test page. Although, for explanatory purposes, the image of the hole pattern of the die associated with record 710 is shown physically residing in a field of the data record itself, it should be appreciated that the image file can reside elsewhere, even remotely over a network, and the location of the image file pointed to by a pointer or a URL of its location. Each of the records of FIG. 7 contain the fields of data in the same format as the example record 710 and each record, in turn, contains or otherwise points to an image of its own respective hole pattern made by the die associated with each record. It should be appreciated that the records shown are illustrative and may contain additional fields, formats, file structures, pointers, references, and the like. Various embodiments of the records of FIG. 7 or the means for storing information of known punch dies for comparison purposes in accordance herewith are intended to fall within the scope of the appended claims.

As previously discussed, as new dies are added to inventory, information about the newly added dies, including an image of the hole patterns thereof, can be added to a newly created record and stored with existing records in a manner illustrated in the embodiment of FIG. 7. The records are retrieved from storage either serially or all uploaded into a memory for ready comparison and display purposes. When a hole pattern of a known punch die is found to match the hole pattern of the installed punch die, various fields of information are retrieved from the record associated with the matching die and displayed on a user interface, in a manner as next discussed with respect to the embodiments of FIGS. 8A-B and 9A-B.

As discussed, as new dies are added to inventory, the key operator would enter information about the new die through a graphical user interface.

Figure 8A:
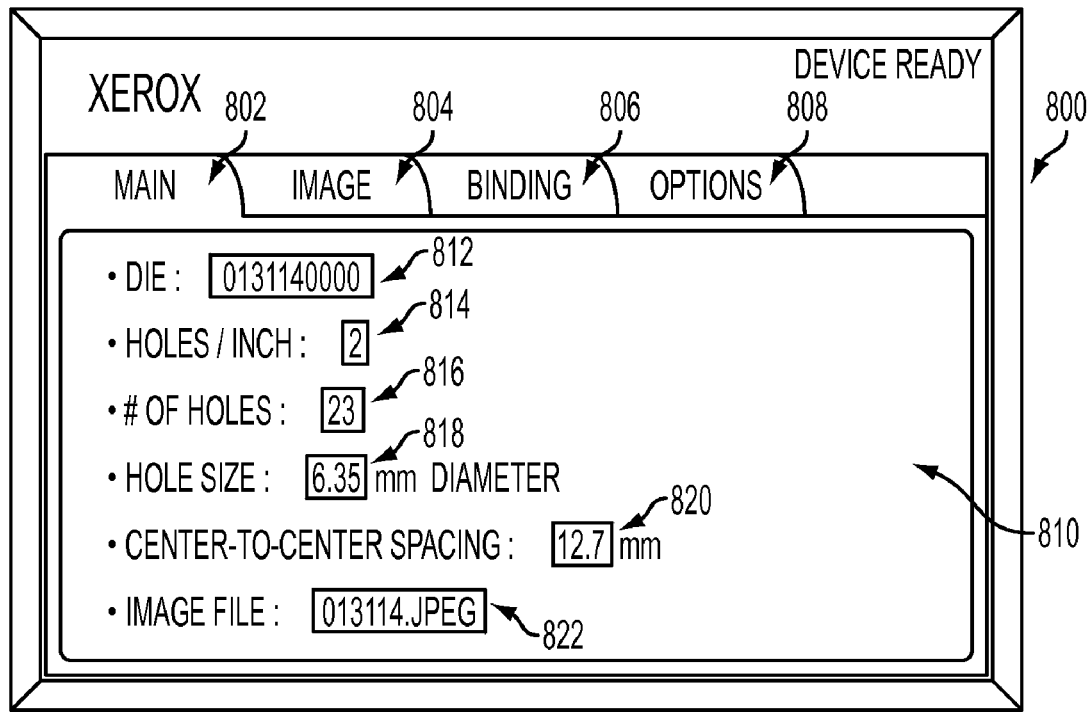
FIG. 8A illustrates an elevated angular view of an example screen displaying various punch die information and other selectable menu options as part of a graphical user interface of a multifunction device whereon various aspects of the present method are implemented.
Figure 8B:
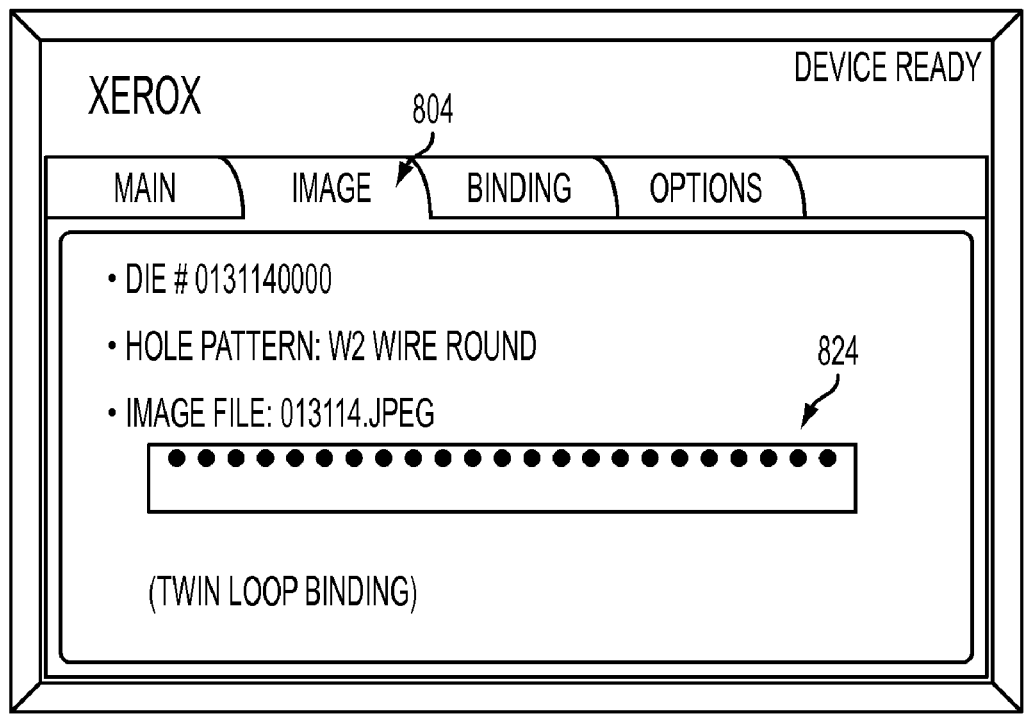
FIG. 8B illustrates an elevated angular view of an example screen displayed when the IMAGE tab of the menu screen of FIG. 8A has been selected.

Reference is now being made to FIGS. 8A and 8B which individually illustrate a topside view of an example screens whereon information and user-selectable options are displayed to effectuate various features of the present method discussed with respect to the flow diagrams of FIGS. 2-5. Such a graphical user interface would, for instance, be associated with document reproduction device 1500 of FIG. 15 or, for instance, the Digital Press 1100 of FIG. 11, and a keyboard and/or keypad enabling the user to enter a string of alphanumeric characters into the corresponding data fields on the display.

User interface 800 includes a plurality of selectable menu options (802, 804, 806, and 808) and a display area 810 whereon information is presented to the user or key operator. The display can be an LCD display, for instance, as are known in the arts. The various selectable menu options will each be explained in turn.

Main menu 802 displays information about the matching known punch die, providing that a die with a matching hole pattern has been found in according with the present method described above. Information about the die found to match the hole pattern of the installed punch die is displayed in area 610 which contains a plurality of data fields. As shown, field 812 displays the serial number "0131140000" of the matching known punch die (1002 of FIG. 10C) which corresponds to REC #1 (710 of FIG. 7). Data field 814 displays for the key operator the number of holes per inch that this die punches. In this example, the current die punches a total of 2 holes/inch. In entry field 816, the total number of holes in the hole pattern for this die are displayed. This particular die punches a total of 23 holes as is shown along a long edge of the test page (of FIG. 6). In display field 818, the hole size of the currently displayed die (1002) is 6.35 mm (0.250 inches in diameter). The center-to-center spacing of the hole pattern of the die is displayed in field 820 which, for this particular die, is 12.7 mm (0.5 inches). Lastly, in data field 822, the name of the image file which contains the hole pattern for this die which, in one embodiment, is used for comparison purposes, is displayed. As shown, the name of this image file has a portion of the serial number of the die itself. Alternatively, other filenames can be used and file locations such as, for example, "c:/user/dies/images/image001.jpg". Or, for instance, a URL location of the image file over a network is used.

It should be appreciated that a box is shown having been drawn around each of the values of the displayed fields wherein a user enters data in the event that a matching punch die is not found or if the key operator is entering the information for a newly received die which has been recently added to inventory. In such an instance, the display area 810 would contain default values in their respective data fields and the key operator would enter (or select) appropriate values for each data field using a keypad or a keyboard associated with the graphical user interface or pull-down menus already pre-loaded with various selectable parameters and values. Upon the entry of the appropriate values in their respective data fields, the values are automatically stored in a newly created record for the die, or an existing record is updated in the event that the operator wishes to change/edit some of the fields in one or more of the stored records. Menu option 804 provides the user with a display of the hole pattern of the die currently shown in the window of main menu 802 (FIG. 8A).

Reference is now being made to FIG. 8B which shows an example screen displayed when the IMAGE menu tab has been selected. This example screen allows the user to view the hole pattern 824. The image file is retrieved from its location in memory or storage and displayed for the user along with other information that the operator would find useful such as, for instance, that the displayed hole pattern is for a Twin Loop Binding selection. It should be appreciated that other information can also be displayed in addition to the image file. Other selectable menu tabs can be added.

Figure 9A:
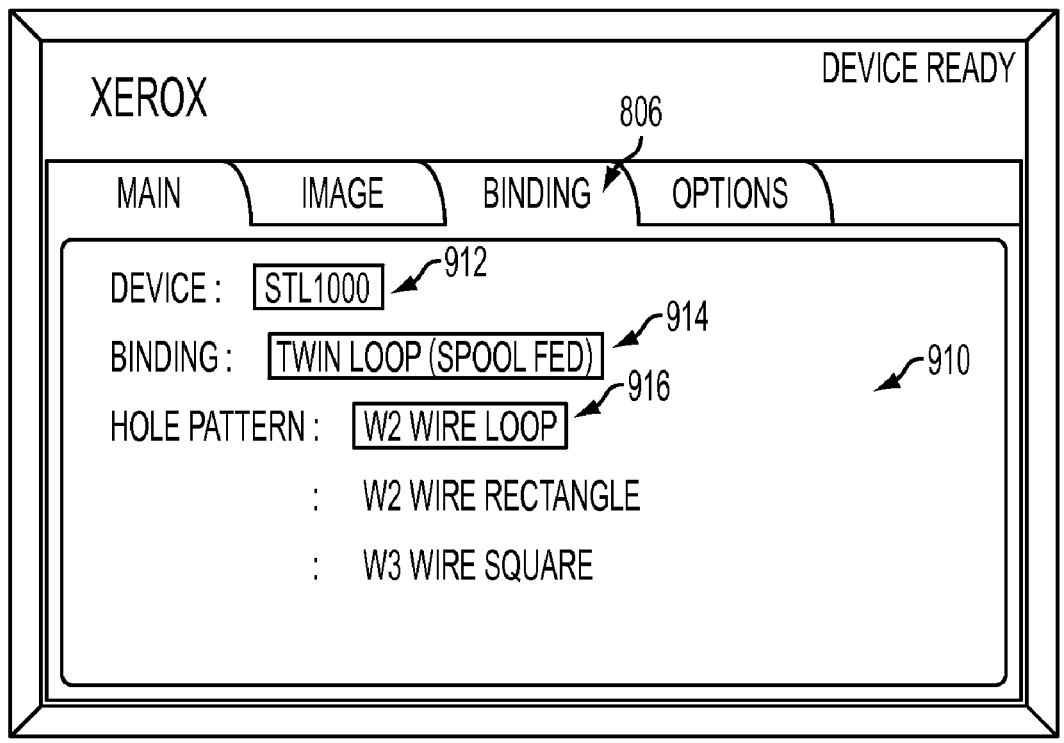
FIG. 9A illustrates an elevated angular view of an example screen displayed when the BINDING tab of the menu screen of FIG. 8A has been selected.

Reference is now being made to FIG. 9A which shows an example screen displayed when the BINDING tab 806 has been selected. This menu tab enables the key operator to enter information about the bindings currently loaded in the hopper or about the current configuration of the finishing options desired by the user for the current print/copy job. Information about the binding settings is displayed in area 910. Example data fields include field 912 which provides the name of the binding device. In this instance, shown is the name of the binding machine of FIG. 13, the "STL1000". The user can enter the alphanumeric characters in the box or, in another embodiment, select them from a pull-down menu. The selected binding is the "Twin Loop (Spool Fed)", as shown in field 914. Data field 916 shows the selected hole pattern for this binding, i.e., "W2 Wire Round", which corresponds to the hole pattern of the image of FIG. 8B. Other selectable options are "W2 Wire Rectangle" and "W3 Wire Square". Other fields can also be displayed depending on the goals and objectives of the end-user of the present method. In another embodiment, the key operator having entered or selected the correct binding device (in field 912) causes the system to automatically display information only for the selected binding device. The selectable data fields thereafter are automatically generated using data retrieved from the device's corresponding data record (or via a network from a remote device).

In such an embodiment, the operator only selects options from various pull-down menus and thus cannot enter incorrect data in any of the data fields.

Figure 9B:
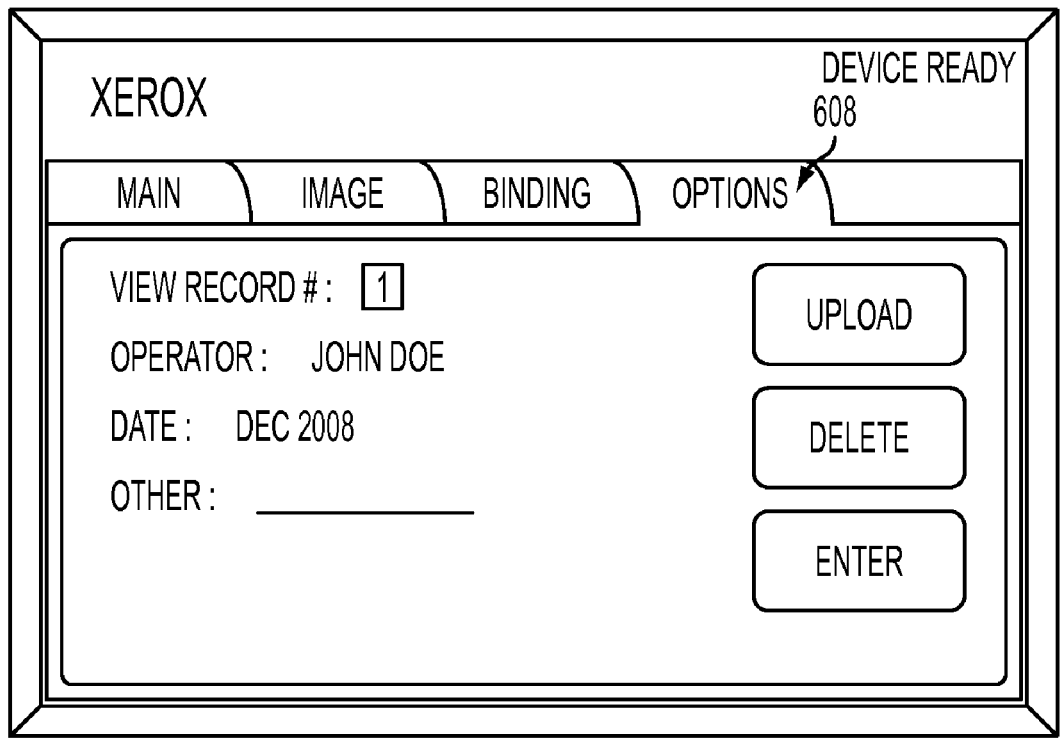
FIG. 9B illustrates an elevated angular view of an example screen displayed when the IMAGE tab of the menu screen of FIG. 8A has been selected.

Reference is now being made to FIG. 9B which shows an example screen displayed when the OPTIONS tab 806 has been selected. Shown are example options that would pertain to the current print/copy job selections such as the record being reviewed (REC #1 of FIG. 7); the name of the key operator "John Doe"; the current date, and various fields marked "OTHER" which are intended to encompass other information that may be desirable to display such as, for instance, customer name and job number. In the example screen of FIG. 9B, if the operator enters a new record number, then that record would be retrieved and displayed. Other menu tabs can additionally be developed for various other embodiments.

The example menu options are illustrative and are intended to provide example screens of displayed information obtained from any of the example records of FIG. 7. It should be appreciated by one of ordinary skill that various displays and menu options are driven by software programs executed by a processor (internal to the device) which is also in digital communication with various programs, DLLs, functions, drivers, and the like, along with various other hardware/software constructs which have been designed to implement the functionality of a display and to upload and store information from/to any of the stored records (of FIG. 7). The display is also integrated with the multifunction device to, in some instances, prevent the user from releasing their print/copy job to the device or, in other instance, preventing the multifunction device from executing a print/copy job until certain incompatibility issues have been resolved or until released by the key operator of the device. Display devices have a wide diversity of designs, functions, capabilities, and implementations, and are common in various streams of commerce.

Figure 15:
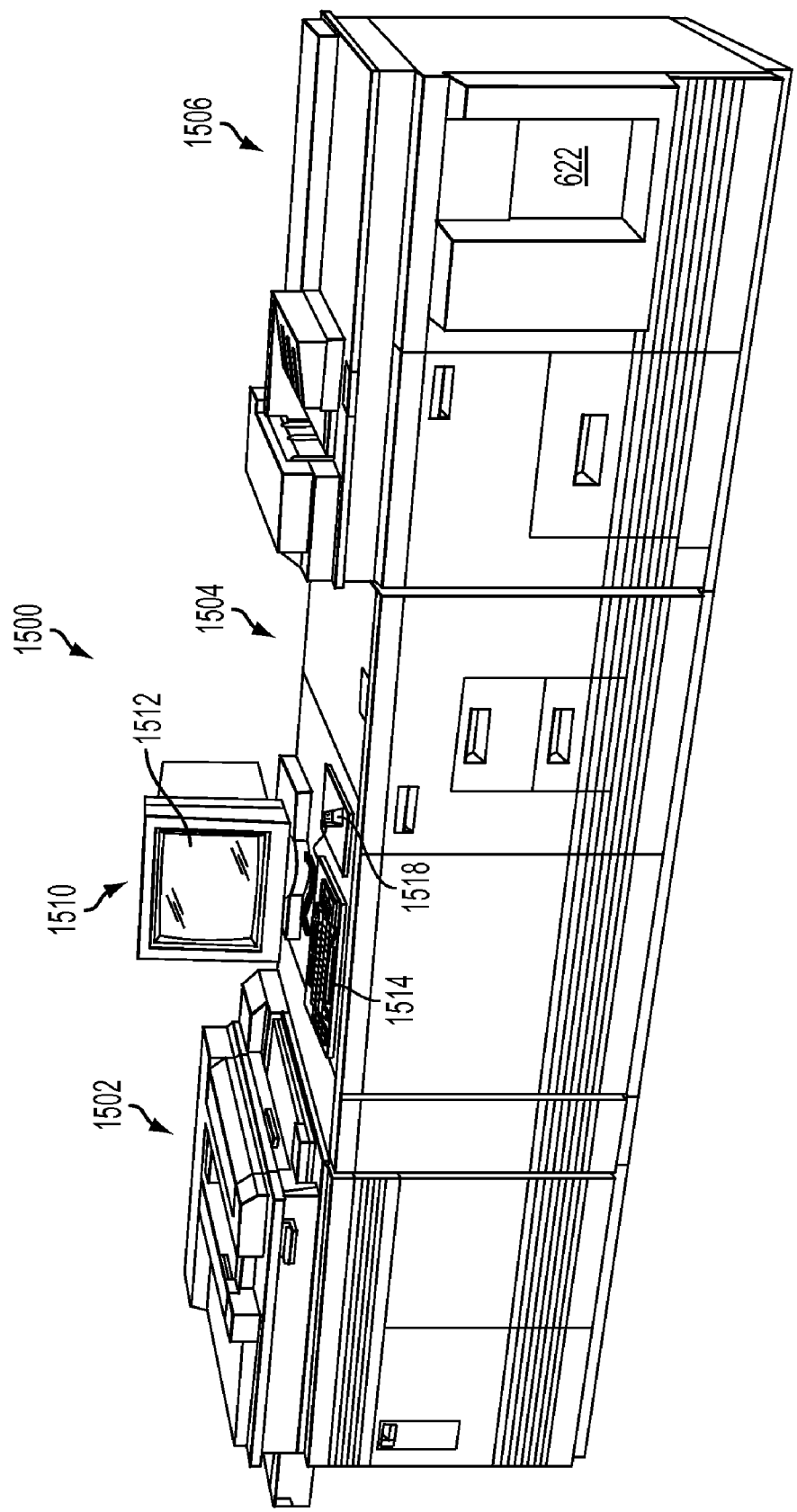
FIG. 15 shows an example document reproduction system intended to be representative of any of the multifunction devices 102 of the networked document reproduction system environment of FIG. 1.

Reference is now being made to FIG. 15 which illustrates one example document reproduction system wherein various aspects of the present method are likely to find their intended uses.

Example MFD 1500 includes a paper feeder module 1502, a printing module 1504, and a finisher module 1506. The document reproduction system further includes a user interface 1510 shown generally comprising display 1512, a keyboard 1514, and mouse 1518. The user interface may be used by a key operator to set parameters and control other document processing operations. The instructions for these various operations may be input via the keyboard and/or mouse, or touch screen objects displayed on the display. Paper feeder module 1502 includes a scanning device for receiving a digital representation of a scanned document. Finisher 1508 includes a modular punch die (not shown) and a binding unit having a hopper to hold a plurality of bindings (also not shown). The document reproduction system of FIG. 15 includes a discharge area 1522 where finished documents are deposited for retrieval. Special purpose controller (internal to system 1500) monitors and regulates various operations of the MDF device. The controller includes a processor capable of executing machine program instructions for carrying out various aspects of the present method via any of a microprocessor or micro-controller, ASIC, electronic circuit, or special purpose computer. Portions of the flow diagrams of the present method may also be implemented partially or fully in hardware in conjunction with machine executable instructions in communication with the controller. The controller also includes a network connection (not shown) for receiving data from a remote device over a network. The controller may also be in digital communication with one or more electronic media readers for the input of data records from electronic storage media such as, for example, a CD-ROM, or a database.

One or more aspects of the present method can be implemented on a special purpose computer system. Such a special purpose system may be any of a micro-processor or micro-controller, ASIC, electronic circuit, or hardware designed to effectuate any aspect of the present method. Such a special purpose computer can be integrated, in whole or in part, with any of the multifunction devices or as part of the computer system shown and discussed with respect to the networked document reproduction environment of FIG. 1. Further, such a special purpose computer may be responsible for managing the displays shown and discussed with respect to the example user interfaces of FIGS. 8A-B and 9A-B.

One example special purpose computer includes a processor capable of executing machine readable program instructions for carrying out one or more aspects of the present method for protecting information displayed on a fax confirmation sheet or for reconstructing a fax confirmation to its original form. The processor may further execute the underlying programs handing the displayed user-selection menu options and/or one or more aspects of the touchscreen display. One such special purpose system includes a main memory for storing machine readable instructions and may further include random access memory (RAM) to support reprogramming and flexible data storage. The main memory may further include one or more buffers to store executable machine program instructions that implement the methods herein. The special purpose system may further include a secondary memory such as, for example, a hard disk drive and/or a removable storage unit which reads/writes to a removable storage device such as a floppy disk, magnetic tape, optical disk, etc., to store data, software, source code, algorithms, and any other machine readable instructions required to implement the teachings hereof. The secondary memory may additionally include various other mechanisms for allowing computer programs or other machine executable instructions to be loaded into the processor for execution. Such mechanisms may include removable storage adapted to exchange data through an interface. Examples of other such mechanisms include a program cartridge and interface such as that found in video game devices, a removable memory chip such as an PROM, EPROM, EEPROM, and the like, and associated socket(s), and other storage units and interfaces which effectuate the transfer of software and/or data. Such a special purpose system additionally includes a communications interface which acts as both an input and an output to allow software and data to be transferred to/from one or more external devices. Examples of a communications interface include a modem, a network interface such as an Ethernet card, a communications port, a PCMCIA slot and card, etc. Software and data are transferred via the communications interface in the form of signals comprising bits of data. Such transferred signals may be in the form of electronic, electromagnetic, optical, radio, RF, and/or other signals capable of being transmitted and received via a communications channel configured to carry such signals. Example communications channels include wire, cable, fiber optic, phone line, cellular link, RF link, and/or other data transmission means. The special purpose computer system may additionally include a display interface that forwards data to a display device, such as a touchscreen display, or a monitor, and may be further placed in communication with a scanning device capable of receiving images of scanned documents and transforming the received images in electronic format. Such a scanning device would be capable of determining color intensity, magnitude, pixel location, spatial variation, and the like, from the pixels comprising the scanned image. The computer system may also be placed in communication with one or more electronic media readers for the transference of data to/from a database or other storage media in communication therewith.

All or portions of the flow diagrams of the present method may also be implemented partially or fully in hardware in conjunction with machine executable instructions. A network connection may be utilized for receiving source image color data points over a network such as an intranet or internet.

The term computer program product is intended to include any computer readable medium, computer executable medium, computer usable medium, or machine readable media capable of providing instructions and/or data to a computer system for implementing one or more aspects of the present method as described. The computer program product is capable of storing data, instructions, messages packets, or other machine readable information, and includes non-volatile memory, such as a floppy disk, hard drive and volatile memory such as ROM, RAM, flash, and the like. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer program product may additionally contain information held in a transitory state such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims. It should also be understood that one or more aspects of the present method are intended to be incorporated in an article of manufacture, including one or more computer program products.

The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A computer implemented method for identifying a hole punch die installed on a multifunction device, the method comprising:

using a hole punch die installed on a multifunction device to mark a hole pattern on a test page;

receiving, from an image input device, a digitized image of said hole pattern marked on said test page;

retrieving, from memory, images of hole patterns of known punch dies;

comparing said image of said hole pattern marked on said test page with said images of said retrieved hole patterns; and in response to a matching hole pattern having been found:
identifying said installed hole punch die based on said matching known punch die; and
notifying a user of an identity of said installed hole punch die.

2. The method of claim 1, wherein, in response to a matching hole pattern having not been found, further comprising notifying said user that said installed hole punch die does not match any of said known punch dies stored in memory.

3. The method of claim 2, further comprising:
obtaining information about an identity of said installed hole punch die; and
storing said digitized image and said obtained identification information.

4. The method of claim 1, further comprising:
receiving information about a binding selected for a print/copy job to be performed by said multifunction device using said hole punch die; and
determining whether said binding is compatible with said hole punch die.

5. The method of claim 4, wherein, in response to said selected binding being incompatible with said installed hole punch die, further comprising preventing said multifunction device from executing said print/copy job.

6. The method of claim 1, wherein notifying said user comprises any of displaying information on a user interface, initiating an audible sound, initiating a visible light, and communicating a message to said user wherein said message comprises any of: a text, an audio, and a video.

7. The method of claim 1, further comprising using any of a size, shape, and location of any holes of said pattern to determine a match.

8. A system for identifying a hole punch die installed on a multifunction device, the system comprising:
a memory;
a storage medium for storing data; and
a processor in communication with said storage medium and said memory, said processor executing machine readable instructions for performing the method of:
using a hole punch die installed on a multifunction device to mark a hole pattern on a test page;
receiving, from an image input device, a digitized image of said hole pattern marked on said test page;
retrieving, from memory, images of hole patterns of known punch dies;
comparing said image of said hole pattern marked on said test page with said images of said retrieved hole patterns; and
in response to a matching hole pattern having been found:
identifying said installed hole punch die based on said matching known punch die; and
notifying a user of an identity of said installed hole punch die.

9. The system of claim 8, wherein, in response to a matching hole pattern having not been found, further comprising notifying said user that said installed hole punch die does not match any of said known punch dies stored in memory.

10. The system of claim 9, further comprising:
obtaining information about an identity of said installed hole punch die; and
storing said digitized image and said obtained identification information.

11. The system of claim 8, further comprising:
receiving information about a binding selected for a print/copy job to be performed by said multifunction device using said hole punch die; and
determining whether said binding is compatible with said hole punch die.

12. The system of claim 11, wherein, in response to said selected binding being incompatible with said installed hole punch die, further comprising preventing said multifunction device from executing said print/copy job.

13. The system of claim 8, wherein notifying said user comprises any of displaying information on a user interface, initiating an audible sound, initiating a visible light, and communicating a message to said user wherein said message comprises any of: a text, an audio, and a video.

14. The system of claim 8, further comprising using any of a size, shape, and location of any holes of said pattern to determine a match.

15. A computer implemented method for determining whether a mismatch exists between a hole punch die installed on a multifunction device and a selected binding element, the method comprising:
using a hole punch die installed on a multifunction device to mark a hole pattern on a test page;
receiving, from an image input device, a digitized image of said hole pattern marked on said test page;
receiving information about a binding selected for a print/copy job to be performed by said multifunction device using said hole punch die;
retrieving, from a memory, hole patterns of known punch dies;
comparing said hole pattern of said received digitized image with said retrieved hole patterns; and
in response to a matching hole pattern having been found:
identifying said installed hole punch die based on said matching known punch die;
determining whether said binding is compatible with said identified hole punch die; and
in response to said selected binding being incompatible with said hole punch die, preventing said multifunction device from executing said print/copy job.

16. The method of claim 15, wherein, in response to a matching hole pattern having not been found, further comprising querying said user for information about an identity of said hole punch die.

17. The method of claim 16, further comprising storing said digitized image and said information about said hole punch die.

18. The method of claim 15, wherein comparing hole patterns of known punch dies with said digitized image of said test page uses any of a size, shape, and location of any of said holes of said pattern to determine a match.

19. The method of claim 15, wherein, in response to a matching hole pattern having been found, further comprising notifying said user of said identity of said installed hole punch die.

20. The method of claim 19, wherein notifying said user comprises any of displaying information on a user interface, initiating an audible sound, initiating a visible light, and communicating a message to said user wherein said message comprises any of: a text, an audio, and a video.

* * * * *